United States Patent [19]

Bussiere

[11] Patent Number: 4,843,249
[45] Date of Patent: Jun. 27, 1989

[54] HYDROELECTRIC SYSTEM

[76] Inventor: Jean L. Bussiere, 2 Ballou St., Dana Ct., Apt. 24, Putnam, Conn. 06260

[21] Appl. No.: 187,564

[22] Filed: Aug. 9, 1988

[51] Int. Cl.⁴ .................................................. F03B 13/12
[52] U.S. Cl. ........................................ 290/53; 290/42
[58] Field of Search ................... 290/42, 53; 417/330, 417/334

[56] References Cited

U.S. PATENT DOCUMENTS

| | | | |
|---|---|---|---|
| 4,034,231 | 7/1977 | Conn et al. | 290/53 |
| 4,048,512 | 9/1977 | Wood | 290/53 |
| 4,137,005 | 1/1979 | Comstock | 290/53 X |
| 4,357,543 | 11/1982 | Penn | 290/42 X |
| 4,625,124 | 11/1986 | Ching-An | 290/53 X |

Primary Examiner—William M. Shoop, Jr.
Assistant Examiner—W. E. Duncanson, Jr.
Attorney, Agent, or Firm—Ira S. Dorman

[57] ABSTRACT

A system for generating electrical power from sea waves employs a multiplicity of turbine units, preferably disposed in a generally V-shaped array. By properly positioning them with respect to the surface of the water and the direction of wave front progression, and in some instances by providing means for diverting the course to water flow, the turbine wheels are caused to rotate so as to drive associated generators and thereby to produce electric power. A control subsystem automatically adjusts the vertical position of the turbine wheels to accommodate tidal variations.

17 Claims, 4 Drawing Sheets

HYDROELECTRIC SYSTEM

BACKGROUND OF THE INVENTION

The waves of the ocean and other large bodies of water represent a vast and virtually inexhaustible source of energy. Although it is believed that efforts have been made in the past to recover the energy of waves, as far as is known no practical means for doing so has heretofore been proposed.

To be feasible, it is believed that such a system must be relatively simple, durable and easy to maintain, and must also be capable of readily accommodating tidal variations. It goes without saying that such a system, and the components thereof, should also be optimally designed and configured for maximum efficiency of energy conversion.

Accordingly, the broad objects of the present invention are to provide a novel and practical system for the recovery of energy from waves, and for generating electrical power therefrom, and to provide a novel turbine unit for use therein.

Related objects are to provide such a system and unit, each being relatively simple, durable and easy to maintain, and being adapted to readily accommodate tidal variations and to efficiently generate hydroelectric power.

SUMMARY OF THE INVENTION

It has now been found that certain of the foregoing and related objects of the invention are attained by the provision of a hydroelectric system comprising a multiplicity of turbine units, and means for positioning a set of a plurality thereof in side-by-side relationship. Each of the turbine units includes mounting means, a turbine wheel rotatably supported by the mounting means, and a machine connected to the turbine wheel for generating electrical power; the units are adapted to permit water flow along a path for driving the wheels. The positioning means disposes the turbine wheels with their axes of rotation somewhat above the nominal surface of the body of water, and substantially on a common axis which extends horizontally and at an acute angle to the general direction of progression of wave fronts along the water surface. The relationship between the mounting means and the positioning means is such as to cause the flow of water to occur predominantly either below or above the axis of rotation of the turbine wheels, to effect rotation thereof in either one direction or the other.

In certain embodiments the mounting means of the turbine units will desirably include a ramp for diverting flow from the nominal surface of the body of water to a level above the axis of wheel rotation. The positioning means advantageously comprises fixed vertical members, adjustably supporting the mounting means of the turbine units so as to permit varation of the level at which their common axis is disposed, preferably in automatic response to changes of water level. As an alternative to using fixed support members, the positioning means may comprise flotation members for supporting the mounting means of the turbine units, and anchoring means for preventing the units from drifting.

A generally V-shaped array of the units will be provided in especially preferred embodiments. To do so, the positioning means of the system will dispose a second set of a plurality of turbine units on a second common axis, which extends horizontally and in the same relationship to the direction of wave front progression as the first-mentioned common axis, but oppositely to it. The positioning means may, in addition, position one or more additional turbine units on a third axis disposed generally perpendicularly to the direction of wave progression, and substantially at the apex of the V-shaped array.

Other objects of the invention are attained by the provision of novel turbine units, as herein described.

DETAILED DESCRIPTION OF THE ILLUSTRATED EMBODIMENTS

Figure 1:
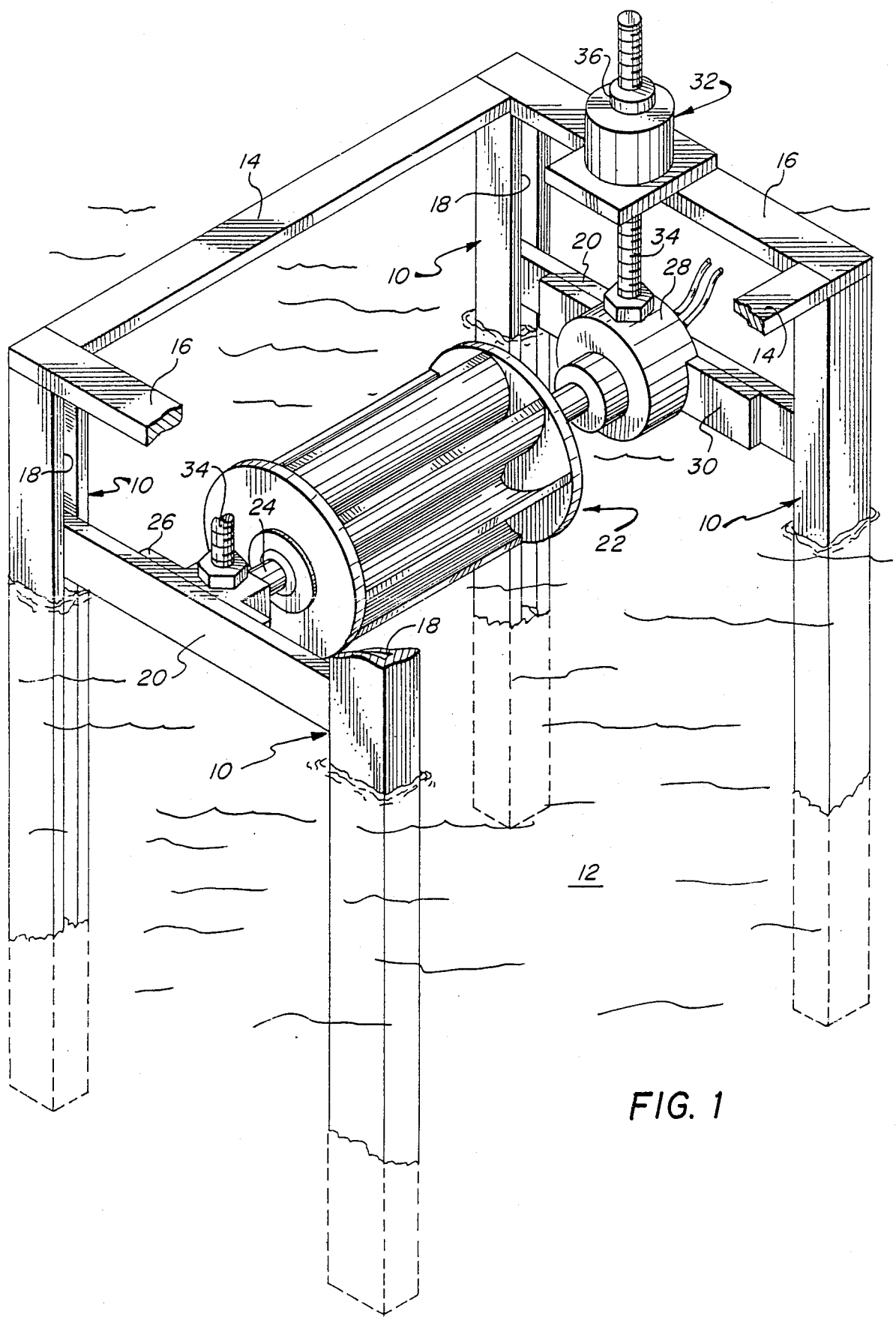
FIG. 1 is a fragmentary perspective view of a turbine unit embodying the present invention.
Figure 2:
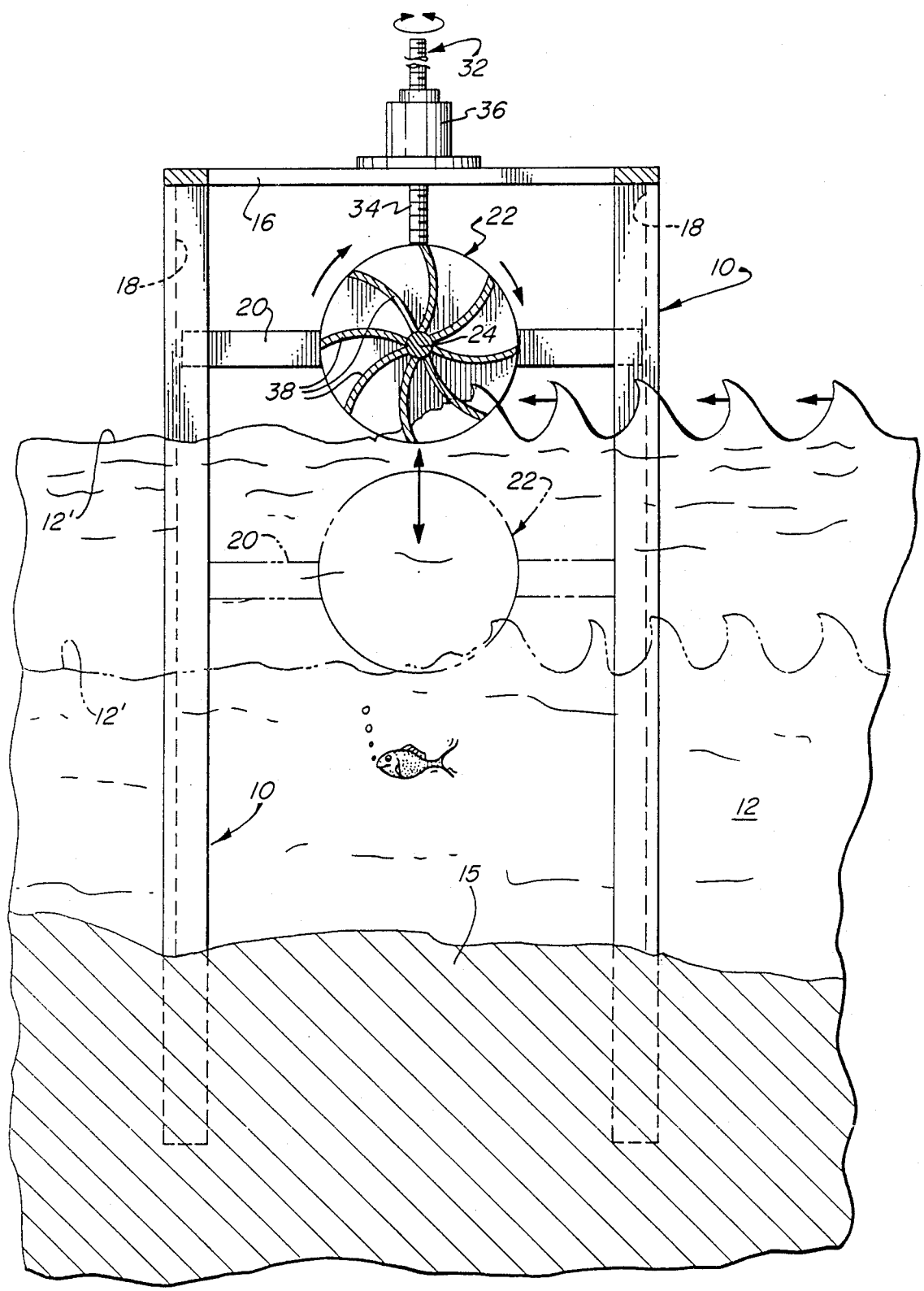
FIG. 2 is a side elevational view thereof, with the turbine wheel of the unit depicted in relatively raised (full-line) and lowered (phantom line) positions.

Turning initially to FIGS. 1 and 2 of the drawings, the turbine unit shown includes a frame-like arrangement of four piles, each generally designated by the numeral 10, driven into the floor 15 of the body of water 12 and joined at the top by rigid side and end cross members 14, 16, respectively. Each pile 10 has a channel 18 running along its length, the channels 18 of the pairs of piles at the two ends of the unit facing one another and slidably receiving the opposite ends of a pair of beams 20.

A turbine wheel, generally designated by the numeral 22, is rotatably mounted between the two beams 20, for which purpose a bearing block 26 is attached at the center of one of the beams 20 to receive one end of the wheel shaft 24. The opposite end of the shaft is supported by a bearing arrangement (not seen) disposed within a water-tight housing 28, the latter having an associated mounting bracket 30 for attaching it to the other beam 20.

A jacking device, generally designated by the numeral 32, is affixed to each of the end pieces 16 (the one at the nearer end of FIG. 1 being removed in large part, for clarity of illustration), and includes a screw 34 which is rotatably engaged with either the bearing block 26 or the housing 28, as the case may be. The cylindrical piece 36 threadably engages the screw 34 of each jacking device 32, and may be rotated (by electrical or other means, not shown) to adjust the position of the associated beam 20. In this manner the position of the turbine wheel 22 is, in turn, varied to accommodate changes in the level of the body of water, so as to maintain the axis of the shaft 24 near to but somewhat above its nominal surface 12, as illustrated in FIG. 2. It will be appreciated that height adjustments may be made in automatic response to a suitable control system, which is responsive to a water-level sensor of appropriate design.

The manner in which the unit functions will be self-evident. FIG. 2 shows the wave fronts proceeding in the direction indicated by the horizontal arrows, and contacting the vanes 38 of the turbine wheel 22 below its axis of rotation, as represented by the shaft 24. The waves passing beneath the wheel 22 drive it in the counterclockwise direction indicated. As suggested by the wires 40 visible in FIG. 1, a machine for producing electrical energy (i.e., a generator or alternator) is contained within the housing 28 and is operatively connected for rotation by the shaft 24, to thereby convert the wave energy into electrical power.

Figure 3:
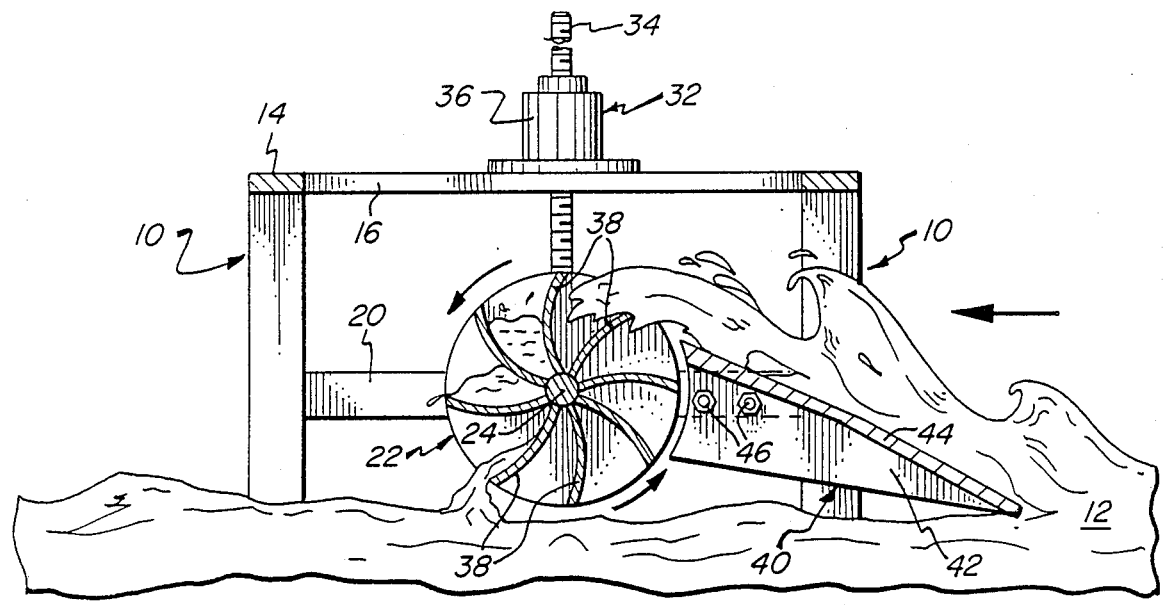
FIG. 3 is a side elevational view of the upper portion of the unit of FIGS. 1 and 2, modified by the addition of a ramp member to divert water flow.

With particular reference now to FIG. 3, the ramp member, generally designated by the numeral 40, which is incorporated into the unit of FIGS. 1 and 2 diverts the flow of water upwardly, to act upon the turbine wheel 22 above, rather than below, its axis of rotation. It consists of a pair of side plates 42 (only one of which is seen) supporting an inclined wall 44, each plate 42 being affixed at its inner end to one of the two beams 20, by nut and bolt fasteners 46. As will be appreciated, the ramp member 40 (and thereby the wall 44 over which the water flows) is raised and lowered along with the turbine wheel 28, to maintain the desired relationship to the surface 12'. The thus modified version of the unit is particularly adapted for those installations or conditions in which wave height makes it impractical to drive the wheel from beneath.

Figure 4:
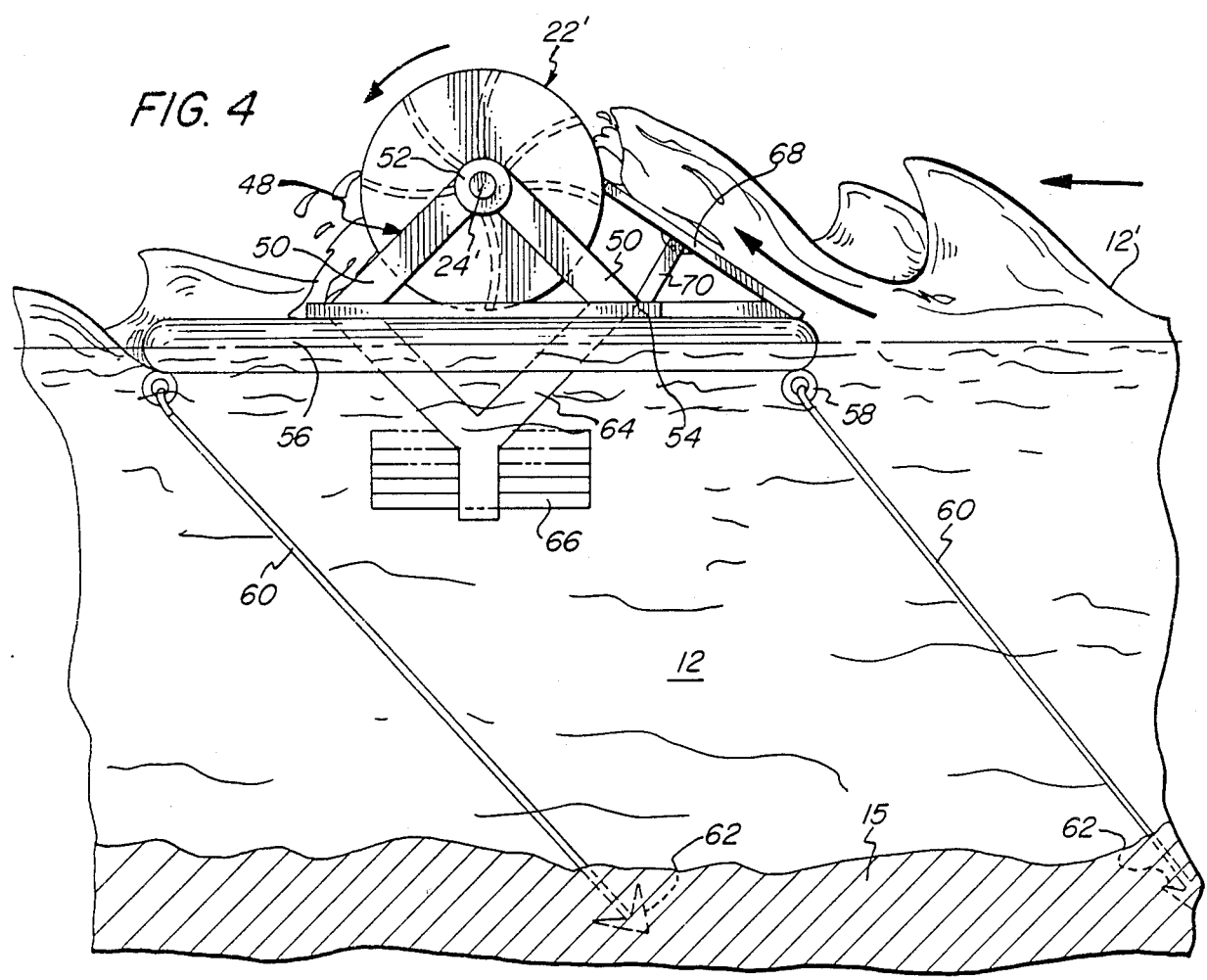
FIG. 4 is an elevational view of a second embodiment of turbine units used in the system of the invention.

A second form of turbine unit which may be used in the system of the invention is illustrated in FIG. 4, and is especially suited for those installations in which water depth makes support upon pilings unfeasible. As can be seen, the turbine wheel 22' is supported on a stand, generally designated by the numeral 48, which consists of pairs (one pair on each side of the base plate 54) of upstanding brace members 50, disposed at a right angle to one another and mounting a hub 52 at the apex thereof, the opposite ends of the turbine wheel shaft 24' being journalled in the hubs 52. The base plate 54 is, in turn, supported upon the upper surface of a float comprised of at least one pontoon 56, to each of the opposite ends of which is attached a connecting ring 58. One end of a cable 60 is secured to each ring 58, and anchors 62 on the opposite ends of the cables are buried in the floor 15 of the body of water to tether the unit. The depending Y-shaped portion 64 of the frame 48 supports a number of weights 66, which afford stability and help to maintain the upright attitude of the unit.

As will be appreciated, because the unit of FIG. 4 floats on the surface 12' of the water, and the turbine wheel 22' thereof is mounted so as to maintain a relatively low center of gravity, it is not practical to rely upon waves passing beneath the wheel to provide the driving force. Accordingly, the unit employs a ramp structure, consisting in this instance of an inclined panel 68 attached at one end to the base plate 54 and supported at a spaced location by a diagonal prop member 70. As shown in the FIGURE, the waves are diverted by the panel 68 to the upper half of the wheel 22'.

Figure 5:
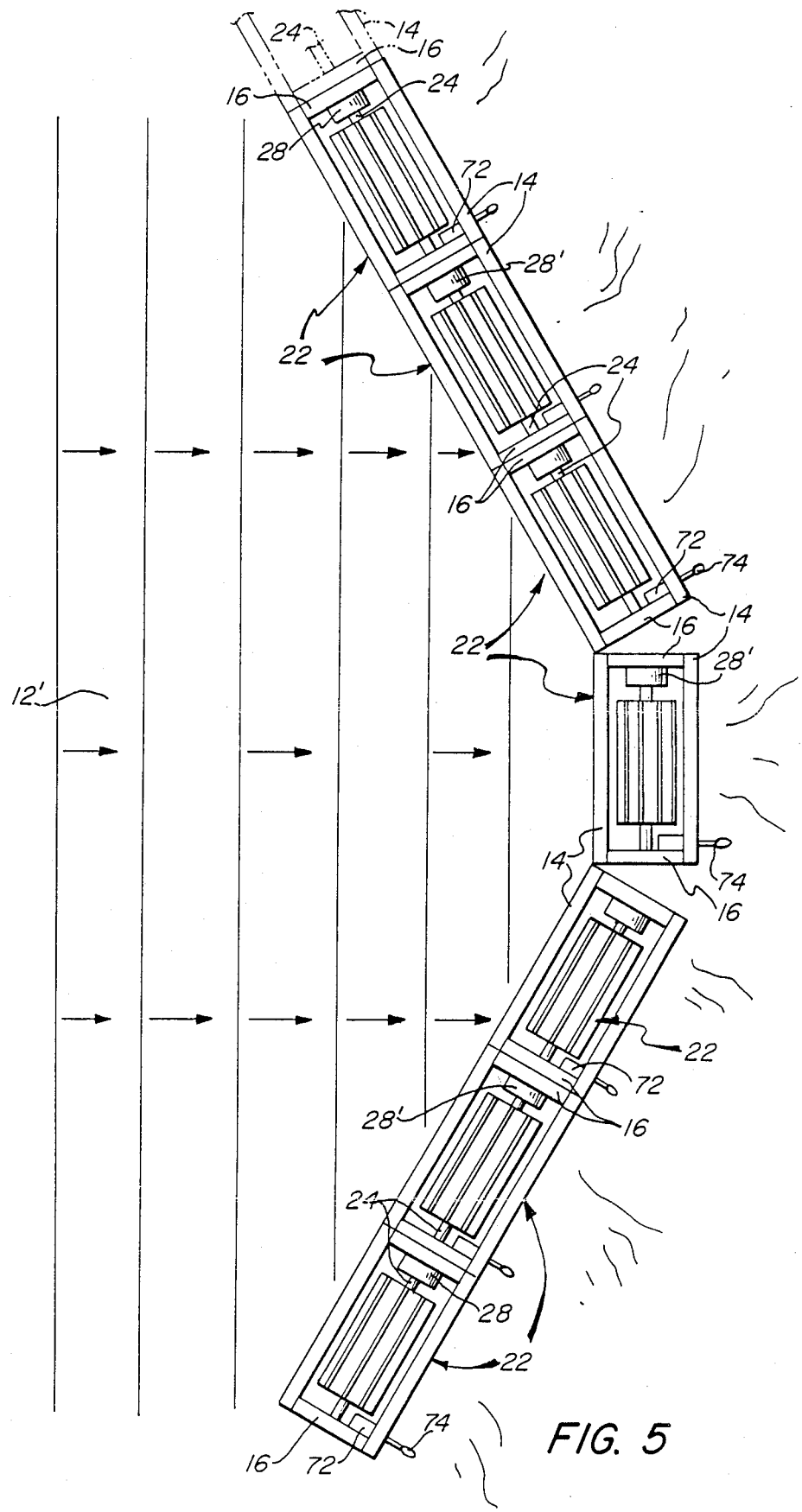
FIG. 5 is a plan view illustrating a system of the invention, comprised of a V-shaped array of turbine units.

Turning finally to FIG. 5, therein illustrated is an array of turbine units constructed substantially as described in FIGS. 1 and 2. They are arranged side-by-side, in an open or flat V-shaped configuration, as two sets of three units with a seventh unit disposed at the apex. It will be understood that, for maximum effectiveness, it will often be desirable to utilize many more than seven turbine units in such an array (e.g., as many as thirty or more), as is suggested by the fragmentary phantom line representation of an end unit; thus, the illustration is not to be taken as limiting in that sense (or, indeed, insofar as the particular shape of the array is concerned).

The arrows in FIG. 5 indicate the direction of wave front progression, from which it can be seen that the waves wash in sequence through each of the units, driving the turbines 22 thereof in a highly efficient manner. Although not illustrated, it will be appreciated that the electrical generating machines of the several units will normally be interconnected to act as a single power supply.

It will be noted that the units shown in FIG. 5 do not include the jacking mechanism 32 for raising and lowering the turbine wheels 22, and that the housing 28' is modified accordingly. Instead, a gearbox 72 is shown, which may advantageously provide an electric motor-driven pinion in meshing engagement with a rack on one of the piles 10, extending along its channel 18, the pinion being mounted upon the beam 20 adjacent thereto; such an arrangement may be provided at both ends of the unit, if so desired. Finally the turbine units of the illustrated system include a diagrammatically depicted water level sensor 74, which is operatively connected to the motor in the gearbox to raise and lower the associated turbine wheel 22, to automatically accommodate tidal variations.

Although the array shown in FIG. 5 consists of separate units in which each turbine wheel 22 is individually supported upon its own shaft 24, with the units emplaced in fixed positions, it will be appreciated that alternative arrangements might employ a common shaft for the turbine wheels, or might flexibly interconnect floating units of the kind shown in FIG. 4. Other modifications will occur to those skilled in the art, and are intended to be encompassed herewithin. The particular design of the electrical and electromechanical components, and of the operative interconnections therebetween, for providing the directional response and power generating capacity required herein, will also be evident to those skilled in the art and need not be described in detail.

Thus, it can be seen that the present invention provides a novel and practical system, and a novel turbine unit comprising the same, for the recovery of energy from waves and for generating electrical power therefrom. The system and unit are relatively simple, durable and easy to maintain, and are adapted to accommodate tidal variations and to efficiently generate hydroelectric power therefrom.

Having thus described the invention, what is claimed is:

1. A hydroelectric system for the generation of power from waves formed in a body of water, comprising: a multiplicity of turbine units, each including mounting means, a turbine wheel rotatably supported by said mounting means, and a machine operatively connected to said wheel for the generation of electrical power by rotation thereof, said units being adapted to permit the flow of water along paths so as to effect rotation of said turbine wheels; and means for positioning a set of a plurality of said turbine units side-by-side, with the axes of rotation of said turbine wheels disposed somewhat above the nominal surface of the body of water and substantially on a common axis, said common axis extending horizontally and at an acute angle to the general direction of progression of wave fronts along the water surface, and said mounting means and positioning means cooperating to cause the flow of water to occur unless diverted predominantly below said axis of rotation, to impinge upon and effect rotation of said wheels in one direction.

2. The system of claim 1 wherein each of said units includes ramp means for diverting the flow of water from the nominal surface of the body thereof to a level above said axis of wheel rotation.

3. The system of claim 1 wherein said positioning means comprises a plurality of elongated support members fixed vertically in place and supporting said mounting means of said turbine units.

4. The system of claim 3 wherein said mounting means is adjustably supported on said support members for vertical movement to permit variation of the level at which said common axis is disposed.

5. The system of claim 4 additionally including adjusting means for adjusting the vertical position of said mounting means on said support members.

6. The system of claim 5 wherein said adjusting means includes an electrically powered motor.

7. The system of claim 6 wherein said adjusting means includes means for sensing the nominal surface of the body of water, said motor being operatively connected to said control means so as to cause said adjusting means to respond automatically to changes of water level.

8. The system of claim 1 wherein said positioning means comprises flotation members supporting said mounting means of said turbine units, and fixed anchoring means for preventing drifting thereof.

9. The system of claim 8, including weighting means for maintaining said units in upright attitudes.

10. The system of claim 1 wherein said positioning means so positions a second set of a plurality of said turbine units on a second common axis intersecting said first-mentioned common axis, said second axis extending horizontally and in the same relationship to said direction of progression as said first-mentioned common axis, but oppositely thereto, to provide a generally V-shaped array of said units.

11. The system of claim 10 wherein said positioning means so positions at least one other of said turbine units on a third axis and substantially at the apex of said V-shaped array, said third axis being disposed generally perpendicularly to said direction of progression.

12. A turbine unit for a hydroelectric power generating system, comprising a plurality of elongated support members; mounting means mounted on said support members for movement lengthwise therealong; a turbine wheel rotatably supported by said mounting means; and a machine operatively connected to said wheel for the generation of electrical power by rotation thereof, said unit being adapted to permit the flow of water along a path therethrough so as to effect rotation of said turbine wheel; said unit additionally including means for adjusting the position of said mounting means along said support members, so as to adjust the position of said supported turbine wheel with respect to the water flow path.

13. The unit of claim 12 wherein said support members comprise piles adapted to be driven into the floor of a body of water.

14. The unit of claim 13 wherein said support members and said mounting means have cooperating gear means thereon for effecting such adjustment of said mounting means.

15. The unit of claim 14 wherein said gear means comprises a rack member extending along the length of one of said support members, and a pinion rotatably mounted on said mounting means in meshing engagement with said rack member, said unit additionally including an electric motor for driving said pinion and thereby effecting such mounting means adjustment.

16. The unit of claim 15 additionally including a sensor for sensing the nominal surface of a body of water, said motor being operatively connected to said sensor for automatically effecting such mounting means adjustment.

17. The unit of claim 12 additionally including ramp means, mounted on said mounting means, for diverting the flow of water from the nominal surface of a body thereof to a level above the axis of rotation of said turbine wheel.

* * * * *